Patented Feb. 1, 1949

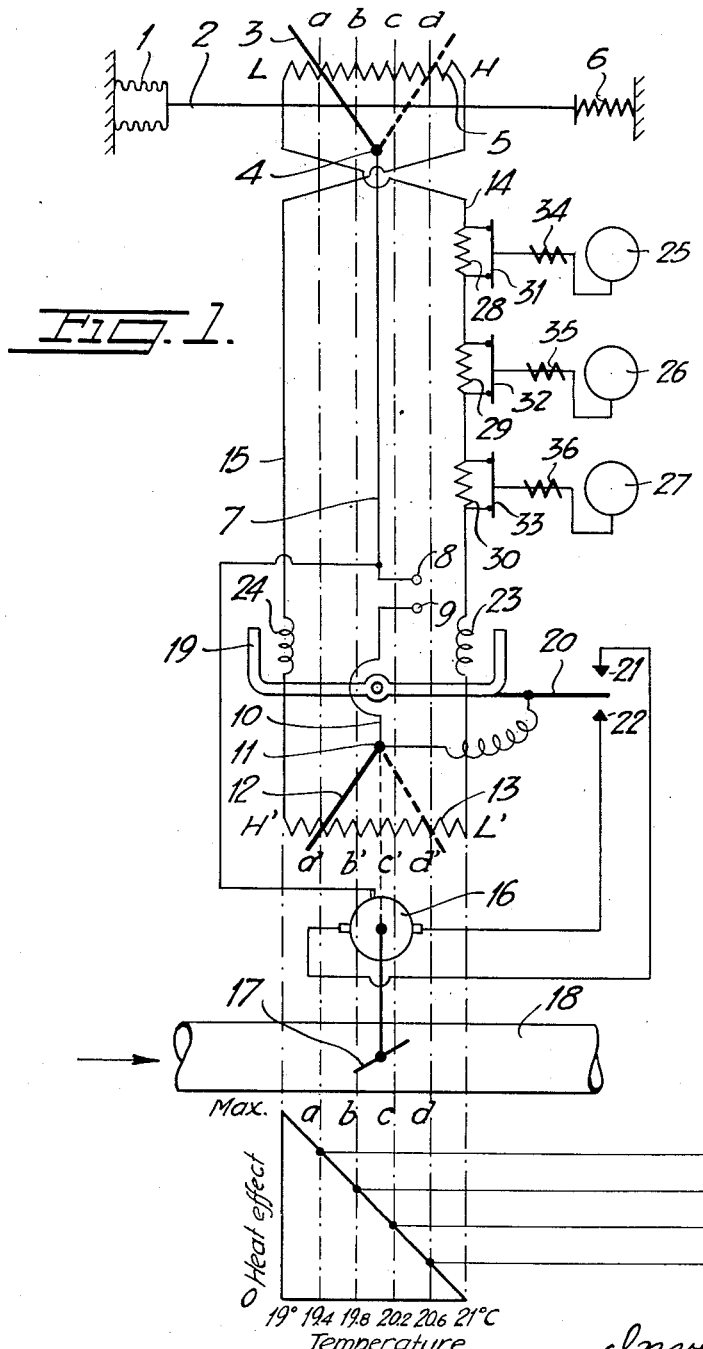

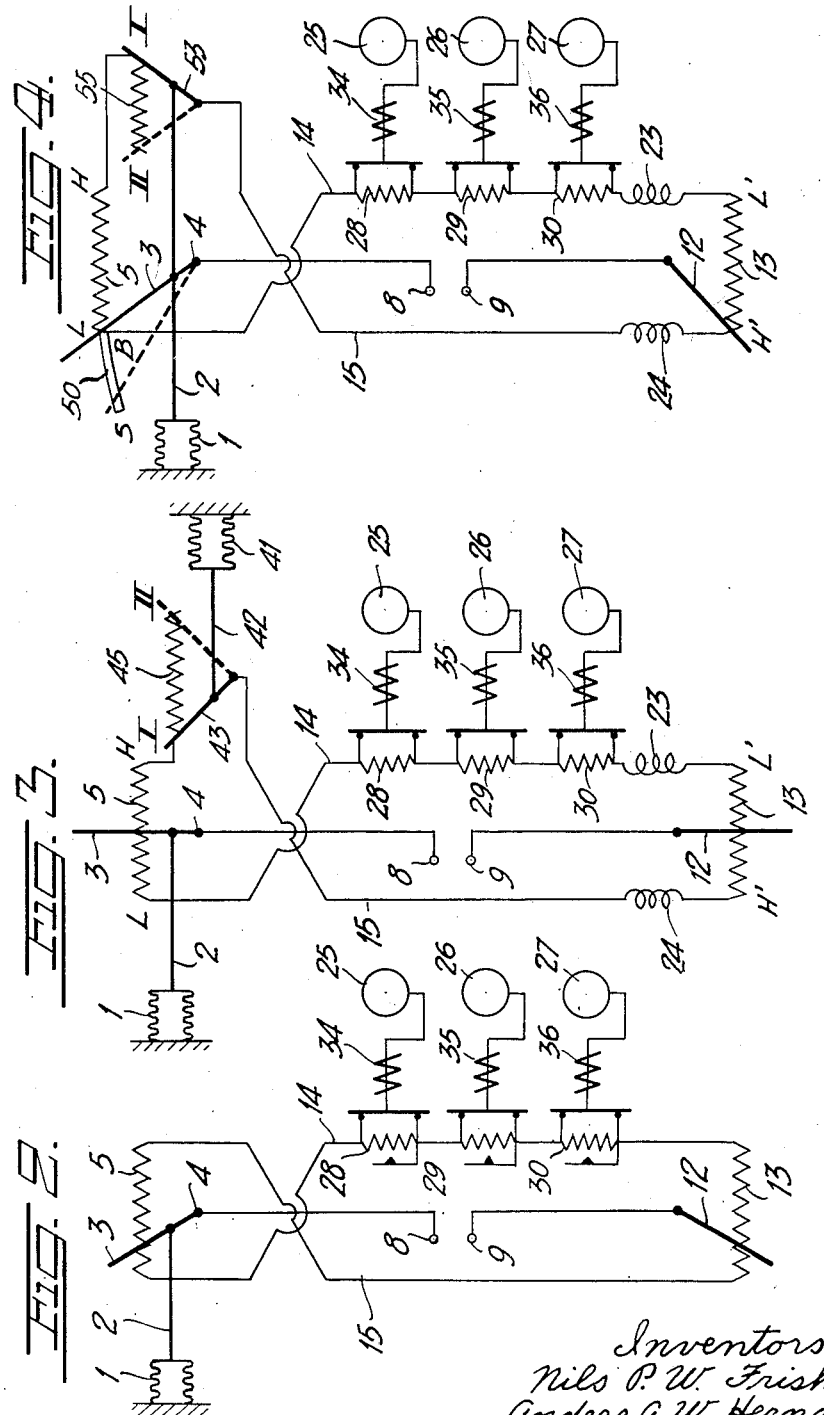

2,460,497

UNITED STATES PATENT OFFICE 2,460,497

AUTOMATIC REGULATING SYSTEM

Nils Pontus Wilhelm Frisk and Anders Georg Wilhelm Hernqvist, Stockholm, Sweden

Application January 15, 1946, Serial No. 641,386
In Sweden January 22, 1945

7 Claims. (Cl. 318—29)

The present invention relates to regulating systems of the type in which a variation of a quantity influencing the value to be regulated effects a proportional variation in the reverse sense of another quantity for readjusting said value.

More particularly, the invention relates to a system of this type which comprises a feeling member responsive to variations of the value to be regulated, an impulse producing element controlled by said feeling member, a regulating motor operated by the impulses produced by said element, and a regulating member controlled by said motor.

Regulating systems of this type are used, for instance, for the regulation of temperatures, pressures, degrees of moisture and for similar purposes. Hitherto known systems are generally so designed that when a change of a quantity influencing the value to be regulated occurs, a corresponding change in the reverse sense of another quantity adapted to effect a regulation for readjusting said value takes place only after the lapse of a comparatively long period of time, that is to say, not until after the value as influenced by said first-mentioned quantity has changed sufficiently to cause the feeling member to react and operate the impulse producing element. In case of a system for regulating the temperature of a hall or another room by varying the supply of heat to a radiator system, an air conditioning system or other type of heating system, a change of a quantity influencing the value to be regulated and which may comprise, for instance, an electric lamp set, a machine tool, a heat emitting furnace or the like, causes operation of the feeling member, as a rheostat, only after the temperature of the room has changed by the admission or withdrawal of heat resulting from said change. Only thereafter an adjustment in order to obtain a new state of balance may commence, generally under oscillations the magnitude and duration of which depend on the time constants of the regulating device but which, at any rate, involves trouble.

The object of this invention is to permit a more rapid obtainment of the new state of balance, while at the same time eliminating or essentially suppressing the generation of oscillations.

The invention is characterized by the provision of one or more impulse producing elements, such as impulse relays, which may act independently of said feeling member and are adapted to be operated directly by the quantity or quantities influencing the condition to be regulated, thereby permitting the regulating motor upon a change of such a quantity immediately to effect a regulating movement of such a nature as to substantially balance said change, so that the value to be regulated will not be changed at all or only slightly changed with the result that the impulse production as released by the feeling member may be suppressed or considerably reduced.

In the accompanying drawing a regulating system embodying the invention is illustrated in Fig. 1, whereas Figs. 2-4 show modifications.

In the drawings the invention is considered as applied to a regulating system adapted to maintain the temperature of a hall or other room within given limits. It is to be noted, however, that the invention is not restricted to such use. It is further to be noted that, while electrical impulse transmission is indicated in the drawings, other impulse transmitting systems may be used, as for instance, hydraulic or pneumatic systems, without departing from the principle of the invention.

With reference to Fig. 1, the numeral 1 designates a temperature responsive member, for instance, a pair of temperature responsive bellows placed in the room the temperature of which is to be regulated. A rod 2 connects the movable bottom of said bellows with a contact arm 3 pivoted at 4 which is adapted to wipe over a resistance 5. Said rod is extended beyond the contact arm 3 and acted on by a compression spring 6 on its end remote from the bellows. The two terminals of resistance 5 are designated by the reference characters L and H, respectively. The contact arm 3 is connected through its pivot 4 and a conductor 7 with one terminal 8 of a source of current, not shown. The other terminal 9 of said source of current is connected through a conductor 10 to the pivot 11 of a contact arm 12 mounted to wipe over a resistance 13 similar to the resistance 5. The two terminals of resistance 13 are indicated by the reference characters L' and H', respectively. In order to render the illustration more simple said terminals L' and H' are reversed with relation to the terminals L and H of resistance 5. The terminal L of resistance 5 is connected through a conductor 14 with terminal L' of resistance 13, and terminal H of resistance 5 is connected through a conductor 15 with terminal H' of resistance 13. The contact arm 12 is operated via a transmission gearing, not shown, from a regulating motor 16. This motor also controls the regulating member represented in the drawing by a valve 17 in a conduit 18 that may be a conduit for supplying hot water, hot air or some other fluid for heating the room the temperature of which is to be regulated. As a regulating valve may be designed so as to obtain a substantially rectilinear characteristic, it should hereinafter be assumed that the valve 17 shown is so designed, which means that the heat effect supplied increases or decreases proportionally with the angle of rotation of the valve.

The regulating motor is supplied with current for operation in the one direction or the other via a switch comprising stationary contacts 21 and 22 and a contact spring 20 carried by the armature of a relay 19 having a winding 23 and 24 in each of the conductors 14 and 15.

As far as thus described the regulating system does not comprise anything except what is well-known in the art. Let it now be assumed that in such a well-known regulating system in which the resistance is equal in both of the conductors 14 and 15, the temperature of the room increases, then the bellows 1 will expand and move the contact arm 3 over the resistance 5 in the direction from L towards H, as for instance, from the position $a$ indicated by a full thick line to the position $d$ indicated by a dotted thick line. This will disturb the balance between the resistances 5 and 13, because portion $d$—L of resistance 5 plus portion $a'$—L' of resistance 13 will by far more overweigh portion $b$—H of resistance 5 plus portion H'—$a'$ of resistance 13, causing a reduction of the current passing through conductor 14 with relation to the current passing through conductor 15. Consequently, the current passing through winding 24 will overweigh and move spring 20 of the relay armature into engagement with the stationary contact 22. The motor 16 receives current and rotates in such a direction as to move contact arm 12 to the position $d'$, thereby restoring the balance between the resistances 5 and 13 and moving spring 20 back to its normal position. In the meantime the valve 17 is turned so as to effect a corresponding throttling of conductor 18.

Generally, the regulating cycle proceeds as follows:

With contact arm 3 of the thermostat positioned at L valve 17 is quite open and the heat effect supplied through conduit 18 is a maximum while according as contact arm 3 approaches the terminal H and the valve 17 closes correspondingly thereby proportionally reducing the heat effect supplied until the valve is completely closed and the heat effect supply is reduced to nil.

With reference to the diagram shown at the bottom of Fig. 1 let it be assumed that with valve 17 quite open the temperature in the room is 19° C. and that at completely closed valve the temperature must not exceed 21° C. The temperature actually existing in the room depends, of course, on the heat load or the cooling of the room and on several other factors too. The several factors or quantities influencing the temperature in the room are represented in Fig. 1 by circles 25, 26, and 27. Each circle may represent, for instance, a lamp set, a heat emitting furnace, a machine tool or the like. Assuming there is a state of balance, for instance, with contact arms 3 and 12 positioned at "$a$" and "$a'$," respectively, and a heat quantity 25 is cut in, another state of balance will gradually arise at "$b$" and "$b'$," respectively, corresponding, for instance, to a temperature of 19.8° C. Assuming the heat quantity 26 being then cut in, still another state of balance will be obtained at "$c$" and "$c'$," respectively, and by cutting in also the heat quantity 27 a state of balance will be at "$d$" and "$d'$," respectively, corresponding, for instance, to a temperature of 20.6° C. The various temperatures of balance depend, of course, on the size of the heat quantities 25, 26 and 27.

It is evident that should the heat quantity cut in be sufficiently large, the contact arm 3 of the thermostat will move to its extreme position H. The temperature, however, can also rise above 21° C. This attainment of various states of balance as above set forth takes place, in fact, only after the lapse of a certain, comparatively long period of time due to the fact that the impulses are not produced until after the room has attained the new temperature. Usually, oscillations arise the magnitude and duration of which depend on the various time constants of the regulating system; anyhow, they mean a drawback. In order to avoid or at least considerably reduce this drawback, at the same time securing a rapid adjustment onto the new value, we have provided according to our present invention certain means, whereby the regulating motor and the regulating valve may be rotated by angles of closure which correspond to the quantities 25, 26 and 27 just referred to, that is to say, to the distances $a'$—$b'$, $b'$, $c'$, $c'$—$d'$. The adjustment to obtain the new state of balance will then take place more rapidly, because of the fact that the amount of heat as supplied to the radiator or the like will be immediately reduced when the respective heat load is cut in or cut out and not, as was previously the case, only after the effect of the quantity of heat cut in has resulted in a rise of temperature which in its turn has influenced the thermostat.

In Fig. 1 a method is illustrated in which to solve this problem. In one of the conductors connecting the resistances 5 and 12 with each other, as for instance, in the conductor 14, a set of resistances 29, 28 and 30 are connected in series. These resistances are normally short-circuited by means of the armatures 31, 32 and 33 of the relays 34, 35 and 36. When energized said relays remove the short circuits. The operating circuits of said relays are controlled in dependency of the respective heat quantities 25, 26 and 27 so that a relay is energized when the respective heat quantity is cut in. Upon the cutting in of a heat quantity, as for instance, 25, the respective relay 34 will immediately be energized, causing its armature 31 to open the short circuit of resistance 28, which is thus connected into the conductor 14. This means a distortion of the balance between the resistances 5 and 13, inasmuch as the current passing through winding 24 of relay 19 overweighs the current passing through winding 23 and causes the relay to move its armature spring 20 into engagement with contact 22. The motor is now set into rotation in the same direction as previously described, causing the contact arm 12 to move in the direction towards L' until another state of balance is obtained between the resistance circuits. In the meantime the valve 17 effects a corresponding throttling of conduit 18.

Assuming the closing movement of the valve causes a decrease of the heat supply which is equal to the amount of heat supplied by the quantity 25, the new state of balance will be obtained without influencing the temperature in the room, that is to say, without changing the adjustment of the thermostat.

By this means it is possible to obtain an immediate operation of the regulating motor and the regulating valve to suit different emissions of heat in the room. In order to obtain the most suitable closing movement of the valve it is an indispensable condition that the resistances 28, 29 and 30 are correctly dimensioned. To this end it should be observed that the contact arm 12 of the regulating motor should be moved one step that is only half that inserted in the circuit 14, because a movement of contact arm 12 over the resistance 13 means an increase of the resistance of one circuit and an equally large reduction of the resistance of the other circuit. As it may be difficult to define the magnitude of the resistances in advance it is preferred to make these resistances adjustable. By this means it is possible after the plant is installed and all factors are known, to effect the adjustment which, in fact, corresponds to the amount of heat as evolved by the sources 25, 26 etc.

A form of adjustable resistances 28, 29 and 30 is indicated in Fig. 2.

It may happen, however, that the amounts of heat as represented by the quantities 25, 26 and 27 are cut in without transmitting any effect to the room due, for instance, to a current interruption or to the fact that the lamps of a light installation are unscrewed. These may cause a closure of valve 17 by the action of the regulating motor, though any heat that would justify this closure has not been supplied to the room. Thus, the temperature of the room might sink considerably. This eventuality may be avoided by combining with the thermostat 1—5 an auxiliary thermostat, as shown in Fig. 3. Said auxiliary thermostat is shown by way of example as a pair of bellows 41 controlling by means of a rod 42 a contact arm 43 wiping over a resistance 45. Said resistance may be connected in series with the terminal H of resistance 5. Normally, the contact arm 43 engages the terminal of resistance 45 that is connected with the terminal H of resistance 5 (position I). In this position the auxiliary thermostat has no influence on the regulation. If, however, the temperature sinks below the regulating range of thermostat 1—5, then the auxiliary thermostat will respond, causing its contact arm 43 to move from position I to its opposite extreme position II. The increased resistance of conductor 15 resulting causes the regulating motor to move its contact arm 13 towards position H' and open valve 17 (cfr. Fig. 1). The extent of movement of the regulating motor depends on the size of the resistance 45 as cut in by the auxiliary thermostat. In order that the regulating motor may move to the position corresponding to a completely open regulating valve, with the thermostat 1—5 adjusted to position L, it is necessary that the auxiliary resistance 45 be equal to the sum of the regulating resistance 13 and the relay controlled resistances 28, 29 and 30 minus resistance 5.

Instead of providing the system with a complete auxiliary thermostat, as shown in Fig. 3, the thermostat 1—5 may be provided with an auxiliary resistance and an associated contact arm controlled by the feeling member 1. An embodiment of this type is shown in Fig. 4. Provided outside the terminal L of resistance 5 is a contact bar 50 which is connected to terminal L so as to allow contact arm 3 to slide thereon without giving rise to any change of resistance. The auxiliary resistance 55 and the associated contact arm 53 controlled by the control rod 2 of the bellows 1 are so arranged that the auxiliary resistance is cut in only after the temperature is sunken in such a degree as to cause the contact arm 3 to leave terminal L of resistance 5 and enter contact bar 50. As long as the contact arm 3 moves along resistance 5, the auxiliary resistance 55 is disconnected and the system operates normally, that is to say, in the way already described in connection with Fig. 1. During the movement of contact arm 3 along contact bar 50 from end L to end S thereof, the auxiliary contact arm 53 moves along the resistance 55 from the end thereof connected to terminal H of resistance 5 (position I) to its free end (position II). By this operation the auxiliary resistance 55 is connected in series with resistance 5. The auxiliary contact arm 53 is connected with conductor 15 provided the remainder of the system is equal to that shown in Fig. 1. The operation is equal to that described in connection with Fig. 3. When the temperature sinks below the regulating range of thermostat 1—5, causing a connection of the auxiliary resistance 55 into the circuit in the way above described, the resistance of conductor 15 increases, causing the relay winding 23 inserted in conductor 14 to operate relay 19. The relay when energized closes contacts 20—21 and starts motor to open valve 17.

As already stated the invention may be applied also to other regulating systems than those based on electrical impulse transmission, as for instance, to systems having pneumatic, hydraulic or mechanical impulse transmission. In such cases the electrical relays 34, 35 and 36 are replaced by pneumatic, hydraulic or mechanical relays controlled by the quantities 25, 26 and 27 in the respective way. The invention is not restricted to the use of three relay circuits, this number being mentioned as an example only. The number of relay circuits is quite optional. Nor is it necessary to effect the cutting in of the resistances gradually. The cutting in operation may equally well take place continuously. To this end the relays 34, 35, 36 etc. should be replaced by a rheostat which is rotated in time with the regulating quantities 25, 26, 27 and may be controlled thereby in any suitable way.

In the embodiments of the regulating system above described it is assumed that the quantities influencing the value to be regulated comprise definite, generally permanently existing units that may be cut in and disconnected whenever desired, as for instance, sets of lamps, machine tools and the like. Assuming that the room the temperature of which is to be controlled consists of a hall adapted to receive a varying number of persons, it is to be noted that the number of persons temporarily staying in the hall is of influence on the temperature of the hall and represents, thus, temperature disturbing quantities. In this case the system above described cannot be applied unchanged.

To suit the regulating system to such use the relays 28, 29 and 30 or the rheostat above mentioned may be replaced by a counting device which connects a resistance corresponding to 28, 29 or 30 or a portion of the rheostat into circuit in response to each person or group of persons entering the hall and disconnects it when said person or persons leaves or leave the hall. Such a counting device may be of any suitable kind controlled, for instance, by photocells and relays provided at the inlets and outlets of the hall.

In those cases where a hall is used and emptied at predetermined times, the resistances 28, 29 and 30 or the rheostat may be connected in circuit and disconnected by means of a time meter adjusted to act at the moments of time when the hall is taken into use and again completely or partially vacated.

The cutting in or cutting out operation by means of a time meter may also take place at a certain time prior to the appearing and disappearing of the interfering load, in order to eliminate the effects of the inertia of the regulating system.

What we claim is:

1. A regulating system of the class specified in which a variation of a quantity or quantities influencing a value to be regulated effects a proportional variation in the reverse sense of the quantity to be regulated, comprising in combination, a regulating member for controlling said last-mentioned quantity, a motor for operating said regulating member, an electric driving circuit for said motor, another electric circuit for controlling the driving circuit of the motor, resistances inserted in said other circuit, relays for short-circuiting said resistances under the control of said first-mentioned quantities influencing the value to be regulated, a feeling member responsive to variations of the value to be regulated for controlling the circuit containing said resistances, the arrangement being such that the resistances are short-circuited when the respective controlling quantities are out of action, but are cut in for changing the state of the circuit containing the resistances when the controlling quantities are brought to activity.

2. A regulating system as claimed in claim 1, in which the feeling member controls a resistance included in a common part of two balanced branches of the electrical circuit controlling the driving circuit of the motor, the normally short-circuited resistances being included in one of said balancing circuits, so that on the removal of the short-circuit of one or more of them a corresponding unbalance between the operating surface results with a resulting operation of the driving surface of the motor.

3. A regulating system as claimed in claim 1, and in which the feeling member controls a resistance included in a common part of two branches of the electrical circuit controlling the operation of the motor's driving circuit, one branch of which contains the normally short-circuited resistances, characterized by the fact that said last-mentioned resistances are independently adjustable.

4. A regulating system as claimed in claim 1, and in which the feeling member controls a resistance included in a common part of two branches of the electrical circuit controlling the operation of the driving circuit of the motor, one branch of which contains the normally short-circuited resistances, characterized by the provision in series with said first-mentioned resistance of an auxiliary resistance which is adapted to be maintained short-circuited as long as the feeling member operates within its normal regulating range but is adapted to be included in the circuit, when the value to be regulated is subjected to a variation outside the regulating range of the feeling member.

5. A regulating system as claimed in claim 1, and in which the feeling member controls a resistance included in a common part of two branches of the electrical circuit controlling the driving circuit of the motor, one branch of which contains the normally short-circuited resistances, and in which there is further provided in series with said first-mentioned resistance an auxiliary resistance adapted to be controlled by means of a separate feeling member adjusted to operate below the regulating range of the feeling member.

6. A regulating system as claimed in claim 1, and in which the feeling member controls a resistance included in a common part of two branches of the electrical circuit controlling the operation of the driving circuit of the motor, one branch of which contains the normally short-circuited resistances, and in which there is further provided in series with said first-mentioned resistance an auxiliary resistance adapted to be operated by means of the feeling member in such a way as to be cut into the circuit when the feeling member is operating below its normal regulating range as determined by said first-mentioned resistance.

7. A regulating system as claimed in claim 1, in which the relays controlled by the quantities influencing the value to be regulated are replaced by a rheostat for effecting a continuous cutting in of resistances corresponding to those controlled by said relays.

NILS PONTUS WILHELM FRISK.
ANDERS GEORG WILHELM HERNQVIST.

REFERENCES CITED

The following references are of record in the file of this patent:

UNITED STATES PATENTS

| Number | Name | Date |
| --- | --- | --- |
| 1,706,968 | Schleicher et al. | Mar. 26, 1929 |
| 2,079,497 | Wilhjelm | May 4, 1937 |
| 2,135,991 | Nessell | Nov. 8, 1938 |
| 2,209,926 | McGrath | July 30, 1940 |
| 2,232,982 | Tank | Feb. 25, 1941 |
| 2,246,686 | Jones | June 24, 1941 |